United States Patent
Swenson et al.

(10) Patent No.: US 8,461,717 B2
(45) Date of Patent: Jun. 11, 2013

(54) ACTIVE FILTERING ELECTRICAL ACCUMULATOR UNIT

(75) Inventors: Josh C. Swenson, Rockford, IL (US); Vietson M. Nguyen, Rockford, IL (US); Joshua Scott Parkin, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 343 days.

(21) Appl. No.: 12/859,353

(22) Filed: Aug. 19, 2010

(65) Prior Publication Data

US 2012/0043815 A1  Feb. 23, 2012

(51) Int. Cl.
*H02J 1/10* (2006.01)
(52) U.S. Cl.
USPC .......................................................... 307/52
(58) Field of Classification Search
USPC .......................................................... 307/52
See application file for complete search history.

(56) References Cited

U.S. PATENT DOCUMENTS

| | | | |
|---|---|---|---|
| 6,142,418 A | 11/2000 | Weber et al. | |
| 6,182,435 B1 | 2/2001 | Niggemann et al. | |
| 6,316,841 B1 | 11/2001 | Weber | |
| 6,509,712 B1 * | 1/2003 | Landis | 320/101 |
| 7,094,496 B2 | 8/2006 | Rodriguez et al. | |
| 7,367,193 B1 | 5/2008 | Thompson | |
| 7,383,903 B2 | 6/2008 | Varenne | |
| 7,555,893 B2 | 7/2009 | Okai et al. | |
| 7,566,981 B2 | 7/2009 | Kunkel et al. | |
| 7,568,958 B2 | 8/2009 | Vigier | |
| 7,634,911 B2 | 12/2009 | Brinkman | |
| 2010/0078938 A1 * | 4/2010 | Coons et al. | 290/7 |

OTHER PUBLICATIONS

U.S. Appl. No. 12/859,368, filed on Aug. 19, 2010, "Method for Controlling an Electrical Accumulator Unit,".
U.S. Appl. No. 12/859,386, filed on Aug. 19, 2010, "Modular Electrical Accumulator Unit,".
U.S. Appl. No. 12/859,928, filed on Aug. 20, 2010, "A Method and Apparatus for Average Current for Control of an Electrical Accumulator Unit,".
U.S. Appl. No. 12/724,691, filed on Mar. 16, 2010, "Control Method for Electrical Accumulator Unit".

* cited by examiner

*Primary Examiner* — Robert L. Deberadinis
(74) *Attorney, Agent, or Firm* — Carlson, Gaskey & Olds P.C.

(57) ABSTRACT

A power generation system has a generator, a power bus and an electrical accumulator unit. The electrical accumulator unit includes an independent controller that actively filters transients from the power bus.

26 Claims, 3 Drawing Sheets

ACTIVE FILTERING ELECTRICAL
ACCUMULATOR UNIT

BACKGROUND

The present application is directed toward power generation systems, and more particularly toward a power generation system using an active filtering electrical accumulator unit.

In order to provide power to electrical systems many vehicles, such as military aircraft, feature an on-board generator which converts rotational movement within the engines to electrical power using known power generation techniques. The generated electrical power is used to power on-board electrical components such as flight controls, sensors, or weapons controls. During standard operations, such a system will have an electrical load which normally draws power at a certain level. When some on-board electrical systems, such as weapons systems, are activated a temporary elevated load spike can occur.

In order to compensate for the temporary load spike, a generator that is rated at least as high as the highest anticipated load spike is typically used. This ensures that adequate power can be provided to the on-board electrical systems at all times, including during elevated load spikes. In a typical power generation system, the physical size of the generator is directly related to the power rating of the generator. Use of a higher rated generator to account for high load spikes results in a heavy generator.

Known generators additionally produce minor fluctuations (also referred to as transients or transient currents) in their output power. To counteract this, passive filters are located at the load. The passive filters smooth the fluctuations, thereby placing the power in a form, which can be efficiently utilized by the loads.

SUMMARY

Disclosed is an aircraft power generation system has a generator and a power bus connected to the generator such that the power bus receives electrical power from the generator. The power bus has a load connection capable of connecting to an external load, thereby providing power to the external load. An electrical accumulator unit is connected to the power bus such that the electrical accumulator unit is capable of storing power from the power bus and providing power to the power bus. The electrical accumulator unit has an independent electrical accumulator unit controller capable of controlling electrical accumulator unit functions and active transient filtering functions of the electrical accumulator unit.

Also disclosed is a method for operating a power system. The method has the steps of: generating power with a generator, converting the power into DC power format, providing the DC power to a DC power bus, detecting a power characteristic of the DC power bus, and inserting a counter-balancing current from an electrical accumulator unit to the DC power bus, thereby smoothing the power characteristic.

Also disclosed is an electrical accumulator unit that has a filter, a power converter, and an energy storage component. The electrical accumulator unit also has a controller coupled to at least one of the filter, the power converter, and the energy storage component.

These and other features of the present invention can be best understood from the following specification and drawings, the following of which is a brief description.

DETAILED DESCRIPTION

Figure 1:
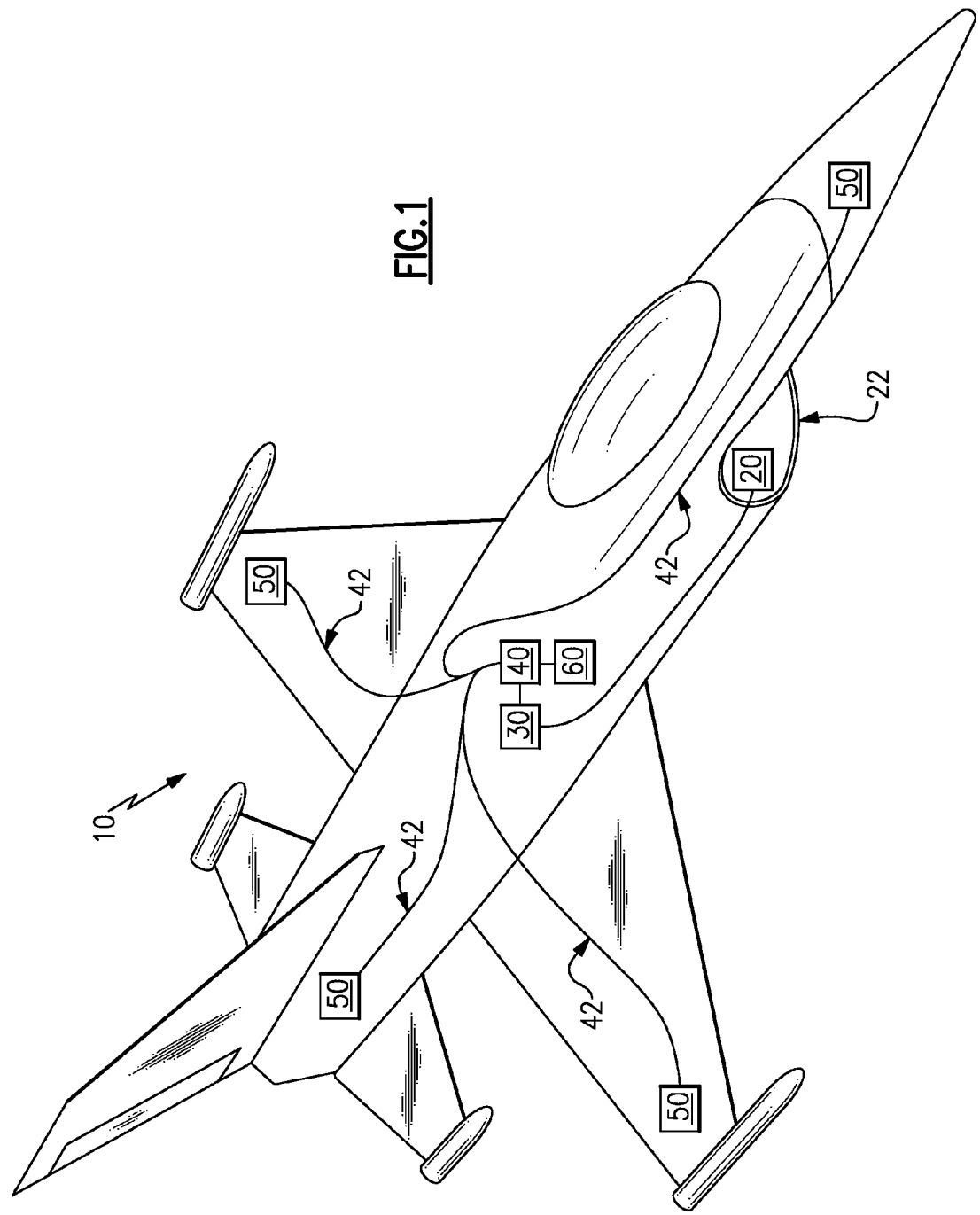
FIG. 1 illustrates a sample aircraft having an on-board power generation system.

FIG. 1 schematically illustrates a sample aircraft 10 having an on-board power generation system. A generator 20 converts rotational motion within an engine 22 into electrical power using known power generation techniques. The generator 20 is electrically coupled to a rectifier 30. The rectifier 30 converts the power generated in the generator 20 (typically three-phase power) into a form usable by on-board electronics 50 (typically DC power). The rectifier 30 is electrically coupled to a power bus 40 which supplies power to the on-board electronics 50 through power supply lines 42. Additionally connected to the power bus 40, is an electrical accumulator unit 60, which can store excess power generated by the generator 20 when the load created by the on-board electronics 50 is low, and reinsert that power into the power system when the load created by the on-board electronics 50 undergoes a high load spike.

Figure 2:
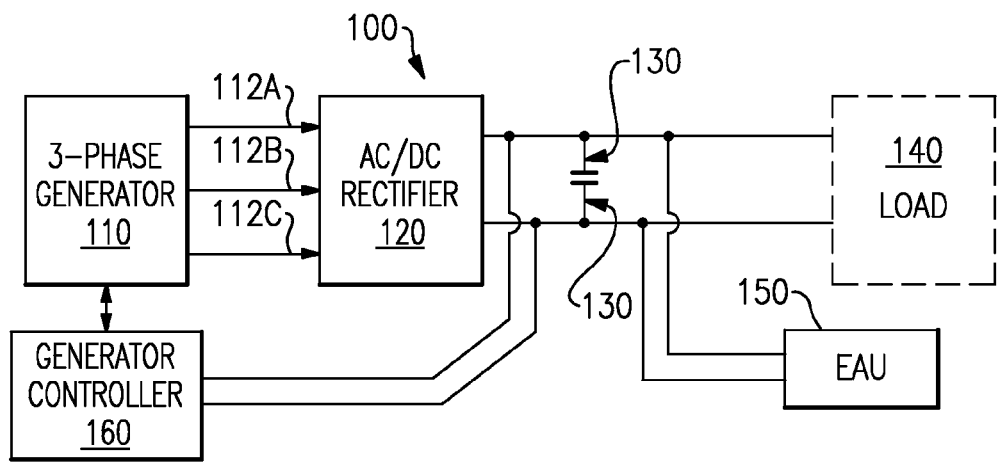
FIG. 2 illustrates an aircraft power generation system including an electrical accumulator unit.

FIG. 2 schematically illustrates a power generation system 100 described with regards to FIG. 1. A three phase generator 110 is connected to an AC/DC rectifier 120 via three phase outputs 112A, 112B, 112C. The three phase generator 110 may also be referred to as generator 110. The AC/DC rectifier 120 converts the generated three phase power into DC power, and outputs the DC power to a DC power bus 130. Connected to the DC power bus 130 is a variable load 140. The variable load 140 (also referred to as an external load) may represent a variable number and size of electrical loads that can change over time and/or be selectively added, removed, or modified. Additionally connected to the DC power bus 130 is an electrical accumulator unit 150. The three phase generator 110, AC/DC rectifier 120, DC power bus 130, variable load 140, and electrical accumulator unit 150 represent embodiments of the generator 20, rectifier 30, power bus 40, the load created by the on-board electronics 50, and electrical accumulator unit 60 of FIG. 1 respectively.

A generator controller 160 (also referred to as controller 160) is connected to the three phase generator 110, and provides control signals for controlling the generator 110. The generator controller 160 is also connected to the output of the AC/DC rectifier 120 via power sensors, and is capable of detecting the power output of the AC/DC rectifier 120 and the power demands of the variable load 140. The electrical accumulator unit 150 includes an independent controller (illustrated in FIG. 3), which allows the electrical accumulator unit 150 to function independent of the functions of the generator controller 160.

Figure 3:
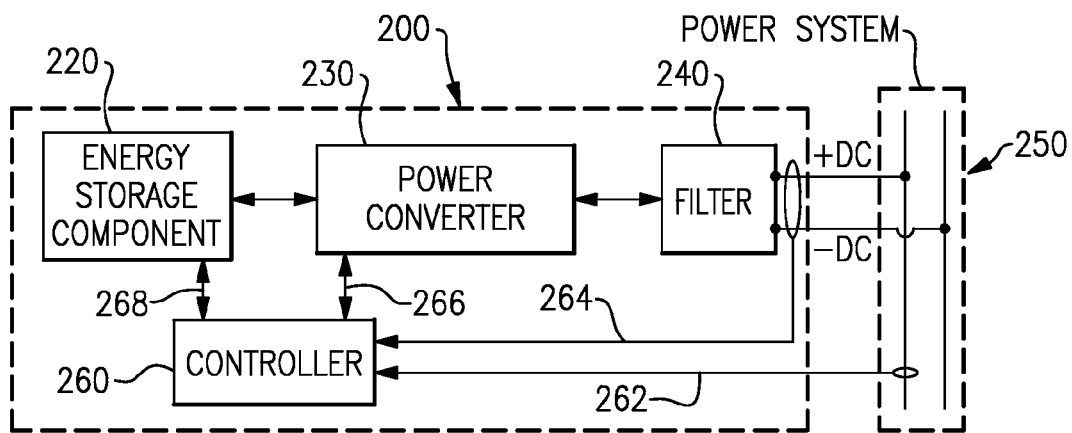
FIG. 3 schematically illustrates an example electrical accumulator unit.

FIG. 3 illustrates a schematic diagram of an example electrical accumulator unit 200. The electrical accumulator unit 200 and power bus 250 represent embodiments of the electrical accumulator unit 150 and DC power bus 130 of FIG. 2. The electrical accumulator unit 200 has four primary components, an energy storage component 220, a power converter 230, a filter 240, and an independent electrical accumulator unit controller 260. The filter 240 is a combination of an ripple filter and an electromagnetic interference (EMI) filter. The ripple filter portion of the filter 240 removes ripple currents, which have leaked onto the power bus 250 due to the presence of power electronics in the load, such as variable load 140 of FIG. 2, or due to the action of the power converter 230.

Similarly, the EMI filter portion of the filter 240 filters out electromagnetic interference present on the power bus 250. Ripple currents and electromagnetic interference are common occurrences in electrical systems and result from the connection the power bus 250 has to the variable load 140 as well as the electrical systems exposure to other sources of electrical noise. Allowing the interference and ripple currents to reach the power converter 230 is undesirable.

After passing through the filter 240, the electrical power enters a bi-directional power converter 230 where it is converted from the form of electrical power used by the power bus 250 into a form which can be accepted and stored by the energy storage component 220. The bi-directional power converter 230 is also capable of converting power output from the energy storage component 220 into the form used on the power bus 250 when the electrical accumulator unit 200 is providing power to the system, such as during a high load spike or while operating in load-leveling source mode.

The energy storage component 220 can be any device or component which is capable of accepting power from the power converter 230 and storing that power for later use. In the illustrated example of FIG. 3, a battery or ultra capacitor (ultra cap) could be used. However, other energy storage components could be used with minor modifications to the electrical accumulator unit 200.

The independent electrical accumulator unit controller 260 can be any type of controller capable of controlling the operational modes of the electrical accumulator unit 200. By way of example, the independent electrical accumulator unit controller 260 could be a digital signal processor (DSP) or a microcontroller. The independent electrical accumulator unit controller 260 is connected to a current sensor 262, which detects the current on the DC power bus 250, and to a voltage sensor 264, which detects the voltage level of the DC power bus 250. The independent electrical accumulator unit controller 260 further detects power converter 230 conditions via a control signal input 266 and energy storage component 220 conditions via a control input 268. The independent electrical accumulator unit controller 260 is capable of controlling the accumulator functions according to known principles, and acting as an active transient filter, as described below.

Figure 4:
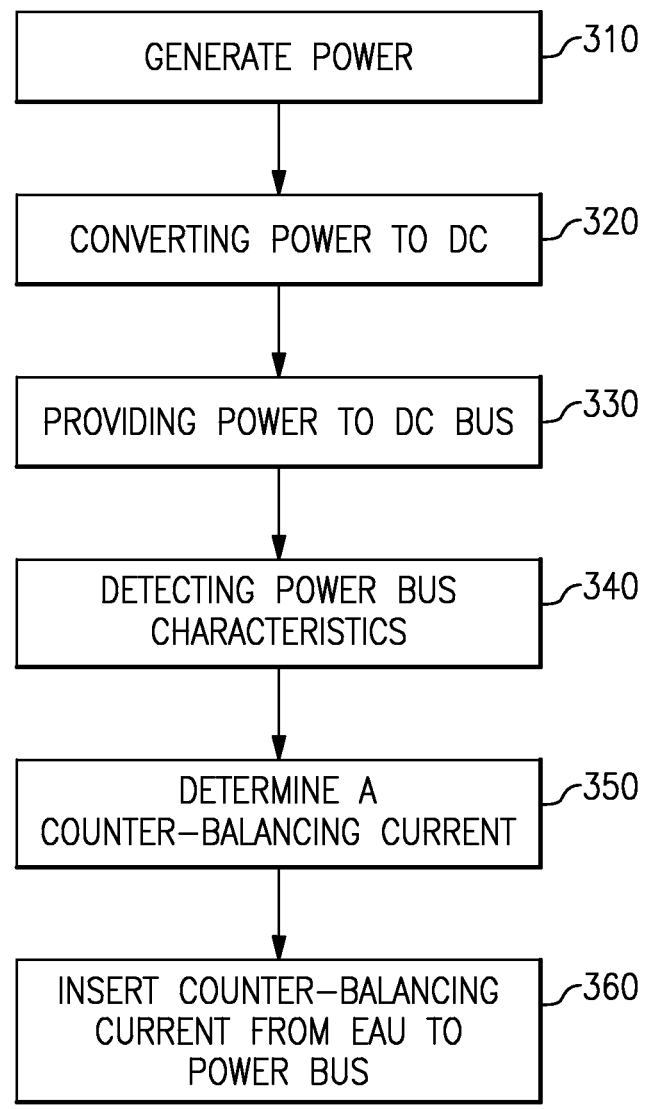
FIG. 4 illustrates a flowchart of an example method for actively filtering a DC power bus.

FIG. 4 illustrates a method by which the electrical accumulator unit 200 (illustrated in FIG. 3) can remove current transients from the DC power bus 250, thereby reducing the need for passive power filtering at the load. Initially, the power system 100 generates power in a generate power step 310. The power is then DC rectified in a convert power to DC step 320, and provided to a DC power bus 130 in a provide power to DC bus step 330.

Power on the DC power bus 130 contains minor variances and fluctuations referred to as transients. In order to remove transient currents from the power on the DC power bus 130, the electrical accumulator unit 200 inserts counter-currents, which negate the transients. To determine the appropriate counter-currents, the independent electrical accumulator unit controller 260 initially detects a power characteristic of the DC power bus, such as current or voltage, in a detect power bus characteristic step 340.

The independent electrical accumulator unit controller 260 analyzes the detected power characteristic and determines a proper counter-balancing current in a determine counter-balancing current step 350. By way of example, the detected DC power characteristic could be a DC bus current. In this example, the independent electrical accumulator unit controller 260 determines a magnitude and direction of a counter-balancing current by taking a derivative of the DC current. The derivative of the DC current is the rate of change of the DC current. The independent electrical accumulator unit controller 260 then inverts the rate of change, resulting in the magnitude and direction of the counter-balancing current. The counter-balancing current can then be provided to the DC bus, thereby smoothing the DC bus current. Another example method of isolating the transient currents from the DC power bus 130 is detecting the DC bus current and passing the detected current through a high pass filter. The high pass filter removes the non-transient current from the signal leaving only the transient current. The controller then inverts the transient current, resulting in a current value which has a magnitude and direction that are calculated to smooth the DC bus current. The controller outputs a control signal, causing the electrical accumulator unit 200 to generate the counter-balancing current. Alternately, other methods of determining a counter-balancing current could be used to the same result.

Once a counter-balancing current has been determined, the electrical accumulator unit 200 inserts the counter-balancing current into the DC power bus 130 in an insert counter-balancing current from electrical accumulator unit to power bus step 360. The power for the counter-balancing current is drawn from the energy storage component 220.

In order to facilitate normal electrical accumulator unit 200 operations and the active filtering function described above, the controller utilizes multiple control paths and generates two output signals, an electrical accumulator unit function signal and an active filter function control signal. Each of the control signals are added together resulting in a single control signal, which is output on control lines 268 and 266, thereby simultaneously controlling the electrical accumulator unit functions of the electrical accumulator unit 200 and the active filtering functions of the electrical accumulator unit 200.

While a method for active filtering transient currents has been described above, it is understood that a similar method could be used, which filters voltage fluctuations instead of current transients. Therefore, an active voltage filtering system also falls within the scope of this disclosure.

Although an example embodiment has been disclosed, a worker of ordinary skill in this art would recognize that certain modifications would come within the scope of this invention. For that reason, the following claims should be studied to determine the true scope and content of this invention.

What is claimed is:

1. A power generation system comprising;
a generator;
a power bus connected to said generator such that said power bus receives electrical power from said generator;
said power bus comprising a load connection capable of connecting to an external load, thereby providing power to said external load;
an electrical accumulator unit connected to said power bus such that said electrical accumulator unit is capable of storing power from said power bus and providing power to said power bus; and
said electrical accumulator unit comprising an independent electrical accumulator unit controller capable of controlling electrical accumulator unit functions and active transient filtering functions of said electrical accumulator unit.

2. The power generation system of claim 1, wherein said independent electrical accumulator unit controller further comprises a current sensor input and a voltage sensor input.

3. The power generation system of claim 2, wherein said electrical accumulator unit further comprises a current sensor connected to said power bus and said current sensor input, thereby allowing said independent electrical accumulator unit controller to detect a power bus current.

4. The power generation system of claim 2, wherein said electrical accumulator unit further comprises a voltage sensor connected to a pair of power bus connectors and to said voltage sensor input, thereby allowing said independent electrical accumulator unit controller to detect a power bus voltage.

5. The power generation system of claim 1, wherein said electrical accumulator unit further comprises:
an energy storage component connected to a power converter; and
a filter connecting said power converter to said power bus.

6. The power generation system of claim 5, wherein said independent electrical accumulator unit controller further comprises a control connection linking said power converter to said independent electrical accumulator unit controller.

7. The power generation system of claim 5, wherein said independent electrical accumulator unit controller further comprises a control connection linking said energy storage component to said electrical accumulator unit controller.

8. The power generation system of claim 1, wherein said active filtering current is an opposite current of a detected transient current on said power bus, and wherein said active filtering current cancels said detected transient current.

9. The power generation system of claim 1, wherein said active filtering current is an inverse of the rate of change of a DC current on said power bus.

10. The power generation system of claim 9, wherein said DC current is an isolated transient current.

11. A method for operating a power system comprising the steps of:
converting power from a generator into DC power format;
providing said DC power to a power bus;
detecting a power characteristic of said power bus; and
actively filtering said DC power characteristic by inserting a counter-balancing current from an electrical accumulator unit to said power bus, thereby smoothing said power characteristic.

12. The method according to claim 11, wherein said power characteristic is a power bus current.

13. The method according to claim 12, wherein said step of detecting a power characteristic further comprises calculating a current magnitude and direction required to smooth said power characteristic based on said detected power bus current.

14. The method according to claim 11, wherein said step of detecting a power characteristic of said power bus further comprises the steps of detecting a power bus current, filtering said power bus current, and determining current transient information based on said filtered power bus current.

15. The method according to claim 14, wherein said step of filtering said power bus current comprises passing said current through a high pass filter, thereby isolating a current transient from said power bus current.

16. The method of claim 15, further comprising determining the counter balancing current by inverting the isolated current transient using a dedicated electrical accumulator unit controller.

17. The method according to claim 11, further comprising the step of controlling electrical accumulator unit accumulator functions and electrical accumulator unit power characteristic smoothing function using a single independent electrical accumulator unit controller.

18. The method according to claim 17, wherein said independent electrical accumulator unit controller generates an accumulator function control signal and an active filtering control signal.

19. The method according to claim 18, further comprising the step of combining said accumulator function control signal and said active filtering control signal, thereby forming a single electrical accumulator unit control signal.

20. An electrical accumulator unit comprising:
a filter having a DC input connection for connecting to a power bus;
a power converter coupled to said filter;
an energy storage component coupled to said power converter;
a controller, controllably coupled to at least one of said filter, said power converter, and said energy storage component; and
wherein said controller is capable of controlling said electrical accumulator unit, such that said electrical accumulator unit generates an active filtering current.

21. The electrical accumulator unit of claim 20, wherein said active filtering current comprises a current magnitude and direction configured to counter-act a transient current.

22. The electrical accumulator unit of claim 20, wherein said controller comprises a current sensor input for receiving a detected power bus current.

23. The electrical accumulator unit of claim 22, wherein said controller further comprises transient isolation controls capable of causing said controller to isolate a transient current from said received power bus current.

24. The electrical accumulator unit of claim 20, wherein said active filtering current is an opposite current of a detected transient current on said power bus, and wherein said active filtering current cancels said detected transient current.

25. The electrical accumulator unit of claim 20, wherein said active filtering current is an inverse of the rate of change of a DC current on said power bus.

26. The electrical accumulator unit of claim 25, wherein said DC current is an isolated transient current.

* * * * *